US010715880B2

(12) United States Patent
Sauer et al.

(10) Patent No.: US 10,715,880 B2
(45) Date of Patent: Jul. 14, 2020

(54) METHOD FOR CREATION AND DISTRIBUTION OF SEGMENTED VIDEO OVER DISTRIBUTED MULTICAST-AWARE SPARSE NETWORKS WITH LOW LATENCY

(71) Applicant: Skitter, Inc., Norcross, GA (US)

(72) Inventors: Mark Sauer, Bragg Creek (CA); Robert Saunders, Alpharetta, GA (US)

(73) Assignee: Skitter, Inc., Norcross, GA (US)

( * ) Notice: Subject to any disclaimer, the term of this patent is extended or adjusted under 35 U.S.C. 154(b) by 26 days.

(21) Appl. No.: 15/685,106

(22) Filed: Aug. 24, 2017

(65) Prior Publication Data

US 2019/0069046 A1 Feb. 28, 2019

(51) Int. Cl.
| | |
|---|---|
| *H04N 21/226* | (2011.01) |
| *H04N 21/2343* | (2011.01) |
| *H04N 21/239* | (2011.01) |
| *H04N 21/262* | (2011.01) |
| *H04N 21/266* | (2011.01) |
| *H04N 21/4545* | (2011.01) |

(Continued)

(52) U.S. Cl.
CPC ..... *H04N 21/8456* (2013.01); *H04L 65/4076* (2013.01); *H04L 65/601* (2013.01); *H04L 67/2842* (2013.01); *H04N 21/23106* (2013.01); *H04N 21/234345* (2013.01); *H04N 21/40* (2013.01)

(58) Field of Classification Search
None
See application file for complete search history.

(56) References Cited

U.S. PATENT DOCUMENTS

2006/0064729 A1\* 3/2006 Steading ........... H04L 29/06027
725/95
2011/0255535 A1 10/2011 Tinsman
(Continued)

FOREIGN PATENT DOCUMENTS

WO 2017/004196 A1 1/2017

OTHER PUBLICATIONS

International Search Report and Written Opinion issued in Application No. PCT/US2018/047695, dated Jan. 25, 2019.

*Primary Examiner* — Brian T Pendleton
*Assistant Examiner* — Jean D Saint Cyr
(74) *Attorney, Agent, or Firm* — Meunier Carlin & Curfman LLC (57) ABSTRACT

A video distribution system minimizes bandwidth use between a headend and a remote video distribution center through an origin segmentation server and an edge segmentation server. The origin segmentation server is located at the headend and creates segments and playlists for every video stream originating at the headend. An edge segmentation server is located at the remote video distribution center and receives a request for a playlist of a content stream from CPE. The edge segmentation server joins a multicast group with the content stream and requests the playlist from the origin segmentation server. The edge segmentation server constructs a second playlist with a predetermined final number of segments from the playlist to return to the CPE, generates segments from the content stream received from the headend, identifies and obtains missing segments from the origin segmentation server, and updates the second playlist with the missing segments and segments generated by the edge segmentation server.

19 Claims, 4 Drawing Sheets

(51) Int. Cl.
*H04N 21/482* (2011.01)
*H04N 21/6375* (2011.01)
*H04N 21/647* (2011.01)
*H04N 21/845* (2011.01)
*H04N 21/231* (2011.01)
*H04L 29/06* (2006.01)
*H04L 29/08* (2006.01)
*H04N 21/40* (2011.01)

(56) References Cited

U.S. PATENT DOCUMENTS

| | | | |
|---|---|---|---|
| 2013/0080581 A1* | 3/2013 | McGowan | H04L 67/10 |
| | | | 709/217 |
| 2014/0222962 A1 | 8/2014 | Mao et al. | |
| 2014/0258449 A1* | 9/2014 | Holden | H04L 65/60 |
| | | | 709/217 |
| 2016/0316235 A1* | 10/2016 | Van Veldhuisen | |
| | | | H04N 21/2368 |
| 2017/0026712 A1* | 1/2017 | Gonder | H04N 21/26616 |
| 2019/0036763 A1* | 1/2019 | Sauer | H04L 41/0654 |

* cited by examiner

METHOD FOR CREATION AND DISTRIBUTION OF SEGMENTED VIDEO OVER DISTRIBUTED MULTICAST-AWARE SPARSE NETWORKS WITH LOW LATENCY

BACKGROUND

Segmenting video into small chunks and then sending the small chunks over the internet has become a popular way to deliver video. Examples of segmented video streaming standards include the HTTP Live Streaming standard (HLS), MPEG-DASH, and Smooth Streaming. A segmentation server receives a video stream as input, and then creates segments or chunks. The segmentation server creates the segments, and stores them on a disk, in computer RAM or in some other method of storage as needed. As the segments are created, a playlist file is maintained that lists the available chunks, and addresses where the chunks can be accessed by a requestor. One key advantage that segmented video delivery has over linear video delivery (e.g. delivery via unicast, multicast or http chunked transfer encoding) is that the playlists, and video chunks can be delivered using ubiquitous http servers and caching technology.

In a cable TV headend, typically there are a large number of satellite receivers, terrestrial broadcast receivers and fiber broadcast receivers. Each of the various types of receivers receive video content which is then passed through a number of video encoders or transcoders to transform the input signals into a format required by the design of the cable TV system. For example, if a cable TV system is using a digital transmission method to their customers, and the customers have customer premise equipment (CPEs) that support playback of MPEG4 AVC video, MPEG4 AAC audio in a MPEG2 Transport Stream, then the encoders or transcoders would input the various formats provided by the various receivers, and output a standard MPEG2 Transport Stream containing the required codecs.

SUMMARY

Aspects of the disclosure provide a content distribution system that comprises an origin segmentation server at a headend comprising a processor and computer instructions stored in a non-transitory computer readable storage medium, wherein the processor is configured to execute the instructions to cause the origin segmentation server to create segments and playlists for a plurality of content streams originating at the headend according to a segmented content streaming standard.

The content distribution system also comprises an edge segmentation server at a remote content distribution center comprising a second processor and second computer instructions stored in a non-transitory computer readable storage medium, wherein the second processor is configured to execute the second instructions to cause the edge segmentation server to receive a request for a playlist of a content stream from a customer premise equipment.

The second processor is configured to execute the second instructions to also cause the edge segmentation server to send a second request to the origin segmentation server for the playlist, identify a predetermined number of final segments from the playlist returned from the origin segmentation server, and send a third request to the origin segmentation server for the predetermined number of final segments from the playlist.

The second processor is configured to execute the second instructions to also cause the edge segmentation server to construct a second playlist listing the predetermined number of final segments and return the second playlist to the customer premise equipment in response to the request.

In some aspects, the content stream is a segmented video stream.

In some aspects, a caching server is between the origin segmentation server and the edge segmentation server. The caching server comprises a third processor and third computer instructions stored in a non-transitory computer readable storage medium, wherein the third processor is configured to execute the third instructions to cause the caching server to receive the second request from the edge segmentation server, determine whether the playlist is stored in a cache store of the caching server, and pass the second request to the origin segmentation server in response to a determination that the playlist is not stored in the cache store.

In some aspects, the processor is configured to execute the instructions to cause the origin segmentation server to create segments and playlists for every content stream originating at the headend according to a segmented content streaming standard.

In some aspects, the second processor is configured to execute the second instructions to cause the edge segmentation server to determine that the edge segmentation server is not already receiving a multicast group with the content stream, and responsive to the determination, send a request to the headend to join the multicast group for the content stream.

In some aspects the second processor is configured to execute the second instructions to cause the edge segmentation server to segment the content stream from the multicast group into a plurality of segments according to a segmented content streaming standard, and update the second playlist with the plurality of segments.

In some aspects, the second processor is configured to execute the second instructions to cause the edge segmentation server to determine one or more missing segments between a last segment of the predetermined number of final segments and a first segment of the plurality of segments, send a fourth request to the origin segmentation server for the one or more missing segments, and update the second playlist with the one or more missing segments.

In some aspects, the second processor is configured to execute the second instructions to cause the edge segmentation server to reset a stream timer associated with the content stream to zero in response to the request for the playlist from the customer premise equipment.

In some aspects, the second processor is configured to execute the second instructions to cause the edge segmentation server to determine whether a subsequent request for an updated playlist for the content stream is received from customer premise equipment in the remote content distribution center within a maximum stream timer threshold value, and leave the multicast group for the content stream in response to a determination that a subsequent request for an updated playlist for the content stream has not been received within the maximum stream timer threshold value.

In some aspects, the second processor is configured to execute the second instructions to cause the edge segmentation server to maintain the second playlist and associated segments on the edge segmentation server as a recording of the content stream for the customer premise equipment.

Aspects of the disclosure also provide a method of distributing segmented content. The method comprises receiving, by an edge segmentation server, a request for a playlist of a content stream from a customer premise equipment. The method also comprises sending, by the edge segmentation server, a second request for the playlist to a server remote from the edge segmentation server. The method also comprises identifying a predetermined number of final segments from the playlist returned from the server. The method also comprises sending a third request to the server for the predetermined number of final segments from the playlist. The method also comprises constructing a second playlist listing the predetermined number of final segments. The method also comprises returning the second playlist to the customer premise equipment in response to the request.

In some aspects of the method, the content stream is a segmented video stream.

In some aspects of the method, the server is an origin segmentation server at a headend. The method further comprises receiving, by a caching server, the second request from the edge segmentation server. The method further comprises determining, by the caching server, whether the playlist is stored in a cache store of the caching server. The method further comprises passing, by the caching server, the second request to the origin segmentation server in response to a determination that the playlist is not stored in the cache store.

In some aspects, the server is an origin segmentation server. The method further comprises creating segments and playlists for every content stream originating at a headend according to a segmented content streaming standard.

In some aspects, the method further comprises determining, by the edge segmentation server, that the edge segmentation server is not already receiving a multicast group with the content stream and responsive to the determination, sending a request to a headend to join the multicast group for the content stream.

In some aspects, the method further comprises segmenting, by the edge segmentation server, the content stream from the multicast group into a plurality of segments according to a segmented content streaming standard and updating, by the edge segmentation server, the second playlist with the plurality of segments.

In some aspects, the method further comprises determining, by the edge segmentation server, one or more missing segments between a last segment of the predetermined number of final segments and a first segment of the plurality of segments. The method further comprises sending, by the edge segmentation server, a fourth request to the server for the one or more missing segments. The method further comprises updating, by the edge segmentation server, the second playlist with the one or more missing segments.

In some aspects, the method further comprises resetting, by the edge segmentation server, a stream timer associated with the content stream to zero in response to the request for the playlist from the customer premise equipment.

In some aspects, the method further comprises determining, by the edge segmentation server, whether a subsequent request for an updated playlist for the content stream is received within a maximum stream timer threshold value and leaving, by the edge segmentation server, the multicast group for the content stream in response to a determination that a subsequent request for an updated playlist for the content stream has not been received within the maximum stream timer threshold value.

In some aspects, the method further comprises maintaining, by the edge segmentation server, the second playlist and associated segments on the edge segmentation server as a recording of the content stream for the customer premise equipment.

These and other features will be more clearly understood from the following detailed description taken in conjunction with the accompanying drawings and claims. Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are provided below, the disclosed systems and methods may be implemented using any number of techniques, whether currently known or in existence. The disclosure should in no way be limited to the illustrative implementations, drawings, and techniques provided below, but may be modified within the scope of the appended claims along with their full scope of equivalents.

Typically, the output from cable TV headend video encoders or transcoders would be streamed using IP multicast to CPE. If the CPE requires video delivery in a segmented format, like HLS, then a segmentation server would be present which would create segments and playlists from the output of the video encoders or transcoders. When a viewer wishes to view a certain channel, the playlist for the relevant stream is retrieved by CPE from a known location, and then the segmented video files are accessed based on the location information present in the playlist. Any needed decryption keys would also be retrieved from instructions in the playlist, and authentication methods programmed into the CPE's middleware.

In large cable TV systems spanning many geographic areas, it can be advantageous to consolidate the video headend in a few locations (e.g. one or more), and then use various communication pathways to send the output of the video encoders or transcoders to the various remote video distribution centers, and then on to the end-user customer premise equipment. Assuming the main headend location is connected to the remote video distribution centers via communication pathways, IP multicast transport of the MPEG2 Transport Stream data is commonly used. Assuming the communication pathway between a headend and a remote video distribution center has limited bandwidth, IP multicast in sparse mode is typically used. With sparse multicast, only multicast groups (containing the video streams) requested by one or more customer premise set top boxes would be transferred across the communication pathway between the headend and the remote video distribution center. Because only a small subset of streams is typically required at any given period of time, the communication pathway between nodes can have a much smaller capacity than if sparse multicast transport were not used. Additionally, it should be observed that with IP multicast transport, only one copy of the stream need be transported on the communication pathway, even if multiple customer premise devices are requesting the stream simultaneously, which also conserves bandwidth between the headend and the remote video distribution center.

This transport model works well, but modern cable TV systems desire Digital Video Recorder or DVR functionality. In many systems providing DVR, the recordings of the video streams occur on the CPE. This requires a great deal of storage on the CPE, and additionally requires the stream to be sent to the CPE during the recording. Many customers require the ability to record multiple programs simultaneously, which then requires multiple streams to be sent to the CPE. This puts considerable additional demands on the network from the remote video distribution center to the CPE, and also from the headend to the remote video distribution center.

Many customers ultimately receiving the streams from a given headend are likely to record the same program at the similar times. A simple solution to reduce the bandwidth demands caused by DVR recordings is to instead devise a scheme where customers can schedule recordings of streams on their CPE, but the actual recordings would be made by servers in the headend, and metadata kept by the cable TV middleware would keep track of which customers own which recordings, where multiple customers could have ownership of a given recording. Commonly these recordings are made using a segmented video recording format, like HLS.

The advantage of storing DVR recordings at the headend is decreased storage requirements by the CPE equipment. But a disadvantage is that when customers want to view their recordings, the CPE would request the data from the headend server, creating multiple unicast file transfers to the headend video segmentation file server. A simple solution to cutting down on the number of unicast file transfers is to use ubiquitous web caching server technology to store commonly accessed file segments and playlists, and then serve them from the remote video distribution center instead of from the main headend.

Disclosed herein is a new solution to the problem of watching live streams from the headend on the CPE, and scheduling and watching recordings. The approach disclosed herein allows for devices requiring IP multicast transport for live stream data, as well as devices that support segmented streaming video (e.g. HLS, MPEG-DASH, Smooth Streaming, etc.) for live streams. In the latter case, a method is provided for allowing for low latency channel changes, and highly efficient use of the communication pathway between headend and the remote video distribution center. The method also provides a way for a remote video distribution center to provide IP multicast as well as segmented video data to a second remote video distribution center. Finally, recordings are made by not deleting the segments owned by customers that had scheduled recordings including the segments (of a stream at a specified time).

A cable TV headend is configured as described above to produce a set of video streams, possibly in MPEG2 Transport Stream format, with parameters compatible with the various customer premise equipment options available. The video streams are streamed over a communication network via sparse IP multicast transport.

At the headend location, one or more segmentation servers are configured to segment every IP multicast stream being produced by the cable TV headed. The set of segmentation servers at the headend are called origin segmentation servers. The origin segmentation servers may be configured to produce segments as described in commonly owned patent application Ser. No. 15/662,870, filed on Jul. 28, 2017 and entitled, "System and Method for Providing Fault Tolerant Streaming of Segmented Content and Cache Coherency on Multi-Hosted Origin Systems," hereby incorporated by reference in its entirety for all purposes.

The origin segmentation server will keep every segment, and playlists to access the segments for a period of time that is a configuration parameter (e.g. 48 hours). The origin segmentation server can be directed to keep the segments for a longer period of time if instructed by the cable TV middleware. Segments no longer required are deleted to conserve space on the origin segmentation server.

At a remote video distribution center, another set of segmentation servers, called the edge segmentation servers, are present. The origin segmentation servers are configured to send segment and playlist data to the edge segmentation servers. The edge segmentation servers are configured to send segment and playlist data to the customer premise equipment (e.g. a customer's TV set-top-box).

The edge segmentation server is configured to accept requests for segments and playlists from customer premise equipment. To conserve bandwidth on the communication link between the headend and the remote video distribution center, the edge segmentation server only creates segments for streams which have been requested by customer premise equipment. The process by which an edge segmentation server receives a request from a customer premise device, joins an IP multicast stream based on the request, requests initial segments from an origin segmentation server, creates new segments, and playlist containing the segments is described in detail below.

Figure 1:
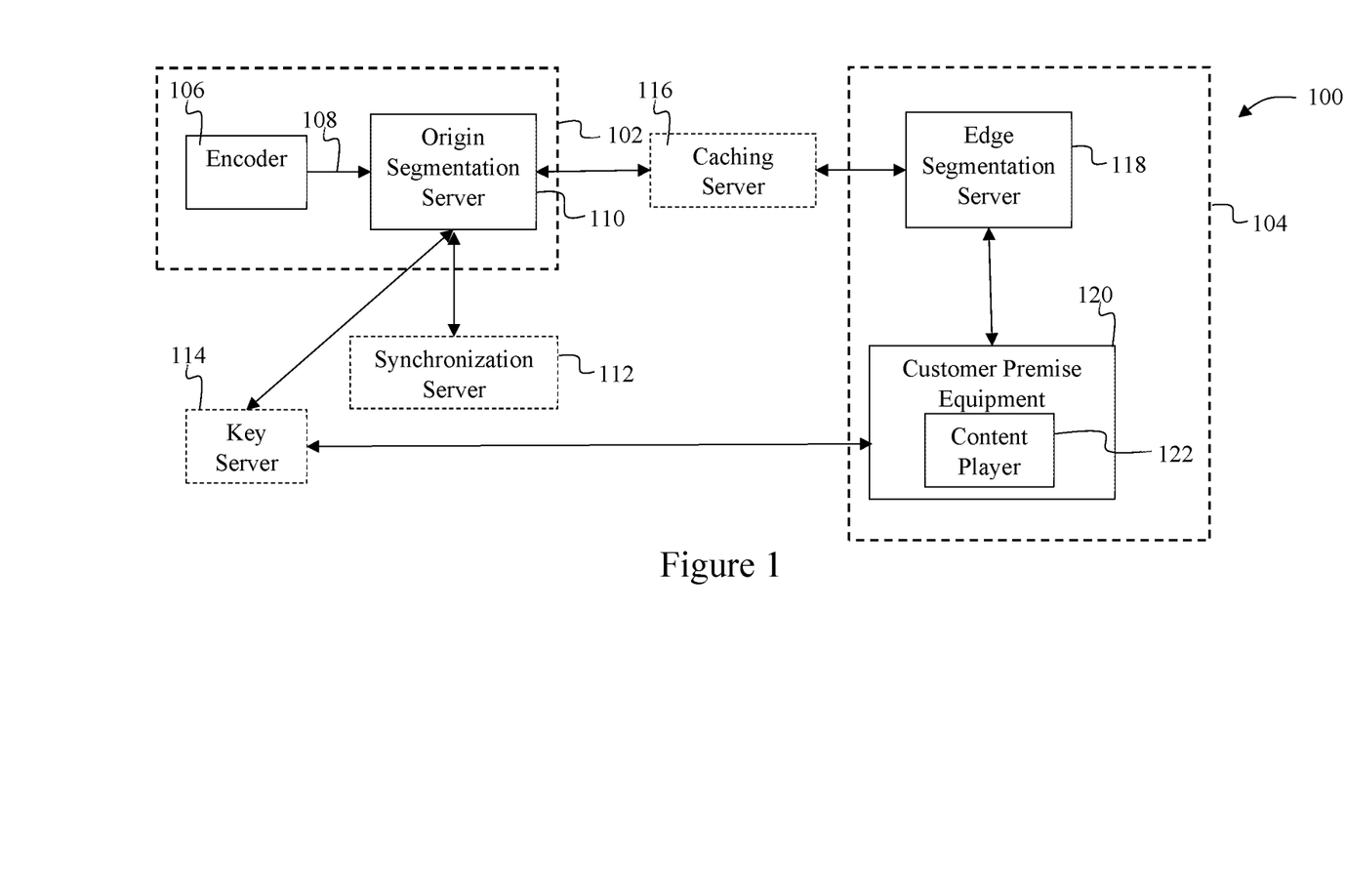
FIG. 1 shows an exemplary video distribution system suitable for implementing various embodiments of the disclosure.

FIG. 1 shows an exemplary video distribution system 100 suitable for implementing various embodiments of the disclosure. The video distribution system 100 includes a headend 102, such as a cable TV headend, and a remote video distribution center 104. While shown in FIG. 1 with a single headend 102 and a single remote video distribution center 104, multiple headends and multiple remote video distribution centers may be used.

The headend 102 includes video encoders and/or transcoders 106 which produce the standardized streams for the video distribution system 100, such as a cable TV system, based on the systems requirements. Commonly, MPEG4 AVC video and MPEG4 AAC audio are encoded and then multiplexed into an MPEG2 Transport Stream for transport via IP Multicast over one or more communication pathways 108, however this disclosure is not limited to these codecs, and is meant to apply to media encoded in any format. Any other video or audio format or codecs may be used, such as including, but not limited to, video in the MPEG4 ASP, MPEG4 AVC, MPEG4 HEVC formats and audio in the MPEG1, MPEG2, MPEG4 AAC formats. Throughout this disclosure, each communication pathway described herein may span one or more networks, such as local area network(s), metropolitan area network(s) (MAN), wide area network(s) (WAN), the internet or other such networks, over one or more transmission mediums, such as wired or wireless (e.g., optical or electromagnetic) communication transmission mediums, using one or more information communication standards (e.g., IEEE 802 standards, SONET, SDH, ATM, etc.). While only a single communication pathway 108 is shown from the output of the encoder 104, additional communication pathways may be present, such as between the encoder 106 and an edge segmentation server 118, as described in more detail below.

In some instances, there are communication pathways (one shown in FIG. 1) between the headend 102 location and the remote video distribution center 104. In other instances, there may be more than one headend location, in which case there are communication pathways between a first headend location and a second headend location. There are also communication pathways between a first headend location and the remote video distribution center 104, as well as between a second headend location and the remote video distribution center 104. In implementations with more than one headend location, the encoders in the respective headend locations may be configured as described in commonly owned patent application entitled, "A Method for Synchronizing GOPs and Key-Frames on Multiple Encoders Without Communication," filed on Aug. 24, 2017, U.S application Ser. No. 15/685,110, hereby incorporated by reference in its entirety for all purposes. As described therein, encoding the GOPs on an encoder based on the presentation time stamp (PTS) in the input stream ensures that multiple encoders processing the same stream will output a stream in which the GOP structure is identical.

The headend 102 also includes an origin segmentation server 110, which creates segments and playlists for every video stream originating at that particular headend 102. That is, the origin segmentation server 110 creates segments and playlists for the video streams output from the encoder 106. While only a single origin segmentation server 110 is shown at the headend 102, in some instances there may be multiple origin segmentation servers to provide failover and load balancing capacity at the headend 102. In such implementations, each origin segmentation server may create segments and playlists for the video streams output from the encoder 106 based on the disclosure in commonly owned patent application Ser. No. 15/662,870, filed on Jul. 28, 2017 and entitled, "System and Method for Providing Fault Tolerant Streaming of Segmented Content and Cache Coherency on Multi-Hosted Origin Systems," hereby incorporated by reference in its entirety for all purposes. The segments and playlists created by each such origin segmentation server 110 are identical for a given video stream. Similarly, origin segmentation servers at other headend locations may be configured as described in the above referenced commonly owned patent application. Likewise, the segments created by the origin segmentation server 110 and an edge segmentation server 118, described in more detail below, are identical and have the same segment numbers. This ensures that the segments retrieved from the origin segmentation server 110 flow flawlessly into the segments created on the local edge segmentation server 118. Creating segments and playlists as described in the above referenced commonly owned patent application ensures seamless failover in the event of the failure of a segmentation server (origin 110 or edge 118) or a caching server 116, described in more detail below, in the video distribution system 100.

When multiple origin segmentation servers are present a synchronization server 112 may facilitate synchronizing each of the origin segmentation servers to provide failover or load balancing capacity in such a way that the segment numbers, playlists, encryption keys, and decryption keys are identical on each of the origin segmentation servers. The synchronization server 112 may receive a request from an origin segmentation server that includes the content stream ID, the playback clock time, and a flag indicating if the requesting origin segmentation server is a master segmentation server for the content stream. The synchronization server 112 returns a current stream epoch count, a stream clock value, and whether this segmentation server is to become the master segmentation server for the stream. The origin segmentation server may then compute segment numbers from the stream epoch count and stream clock value. Because all of the origin segmentation servers will receive the same values for the stream epoch count and stream clock value, all of the segmentation servers will compute the same segment numbers.

In some implementations, the origin segmentation servers may all be synchronized to generate identical segment numbers, playlists, encryption keys, and decryption keys without the use of the synchronization server 112 if all of the origin segmentation servers receive each packet in a content stream at the same wall clock time (e.g., standard time, such as GMT, TAI, UTC, etc.).

If encryption is desired, a key server 114 may facilitate providing encryption and decryption keys for each segment in a content stream. Each encryption key is associated with a key number and content stream name. Each of the origin segmentation servers may calculate the key number based on the segment number for the content stream. Because all of the segment numbers are identical on all of the origin segmentation servers, the key numbers will likewise be identical. Upon receiving a request from an origin segmentation server with a key number and content stream name, the key server 114 responds with an encryption key and a location (e.g., URL) for obtaining a decryption key. Accordingly, the segments and playlists created by each such origin segmentation server are identical for a given video stream.

In some instances, a series of one or more caching servers 116 may exist between the remote video distribution center 104 and the headend location 102. If a caching server 116 is present, then requests from the remote video distribution center 104 are made to the caching server 116 in between the remote video distribution center 104 and the headend 102. The caching server 116 will check its cache store to determine if the requested segment or playlist is present in the cache, if so it will return the cached copy back to the requestor. If the cache store on the caching server 116 does not contain the requested segment or playlist, then the cache server 116 will pass the request to a second caching server (not shown) in between the remote video distribution center 104 and the headend 102. This process repeats until there are no further caching servers between the remote video distribution center 104 and the headend 102, at which point the caching server 116 passes on requests to the origin segmentation server 110. Implementing the caching server 116 as described in the above referenced commonly owned patent application provides for cache coherency in the sense that should a CPE request for a certain stream segment with the same name and segment number, from different caching servers, the contents of the returned segments are identical. While the caching server 116 is shown in FIG. 1 only in communication with a single video distribution center 104, the caching server 116 or group of caching servers (not shown) may be in communication with multiple video distribution centers.

In the remote video distribution center 104, there is an edge segmentation server 118 and customer premise equipment (CPE) 120. While only one CPE 120 is shown, many CPEs may be present in the video distribution center 104. Additionally, while only one video distribution center 104 is shown in FIG. 1, many video distribution centers may be present. The edge segmentation server 118 is configured with all the available channels, but does not actually request a stream from the headend 102 or begin segmentation of the stream, unless at least one CPE device has requested the stream. In some implementations, the edge segmentation server 118 has a configuration file listing all the streams (e.g. channels) for which it can produce segments. The configuration file includes a multicast address the edge segmentation server 118 needs to access stream data, as well as the ID for a stream group, and the IDs for each sub-stream within the stream group. The configuration file indicates whether the stream should be streamed all the time, or if it should only be streamed if there is at least one user requesting updated playlists for the stream.

When a customer wants to watch a certain channel live, they tune the channel on their Set Top Box or CPE 120. The CPE 120 may connect to the requested stream using a segmented streaming standard (e.g. HLS, MPEG-DASH, Smooth Streaming, etc.). The CPE receives an address (e.g. URL) for the playlist from the middleware software (not shown) for the video distribution system 100. In some implementations, the middleware software may be executed on the CPE 120 or on a device in communication with the CPE 120. The CPE 120 will send a request for the playlist or manifest to the edge segmentation server 118 (using the address received from the middleware) in the remote video distribution center 104 for the requested stream.

The edge segmentation server 118 runs a check to determine if it is currently receiving a multicast group with the requested stream from the headend 102 and creating segments for the requested stream. If the requested stream is already being segmented by the edge segmentation server 118, the edge segmentation server 118 returns the playlist or manifest file for the requested stream. The CPE 120 will receive the playlist file, and request segments as listed by the playlist or manifest file. For instance, the CPE 120 issues a request for the first segment listed in the playlist to the edge segmentation server 118. In some instances, the CPE 120 will also issue a request for a decryption key for the first segment to the key server 114. Upon receiving the requested first segment and decryption key for the first segment, a content player 122 on the CPE 120 may play the content of the first segment. Subsequent segments in the playlist may similarly be requested and played back by the CPE 120.

Periodically, the CPE 120 will issue a request to the edge segmentation server 118 for an updated playlist that includes the latest segments for the requested stream. Each time the edge segmentation server 118 receives a request for an updated playlist from a CPE 120, a stream timer is reset to 0. When the stream timer indicates that no requests have been received from the CPE 120 or any other CPE in the video distribution center 104 for the stream for a predetermined period of time (e.g. 2 minutes), the edge segmentation server 118 will stop segmenting the requested stream, and leave the multicast group for the stream, causing the requested stream to stop transferring across the link between the headend 102 and the remote video distribution center 104.

Upon receiving the request for the stream from the CPE 120, if the edge segmentation server 118 is not currently receiving the multicast group with the requested stream and creating segments for the requested stream, then the edge segmentation server 118 will block on replying to the request. The edge segmentation server 118 will wait on returning the playlist to the CPE 120 until it can connect to the multicast group for the requested stream and have enough data to build an initial playlist, as described in more detail below.

The edge segmentation server 118 joins the multicast group(s) for the set of variants (different bitrates and resolutions) of the requested stream. The edge segmentation server 118 will begin to create segments and maintain a playlist for the requested stream. In some implementations, the edge segmentation server 118 will create segments and playlists following the disclosure of the commonly owned patent application referenced above. In this way, the edge segmentation server 118 will generate the same segments and playlist for the requested stream as the origin segmentation server 110.

The edge segmentation server 118 continues to create segments, until the playlist has a minimum number of segments of the requested stream, herein referred to as an initial playlist. In some implementations, the minimum number of segments is at least one complete segment of the requested stream. Once the minimum sized playlist containing at least the minimum number of segments is populated, the edge segmentation server 118 returns the playlist back to the CPE 120. The CPE 120 receives the playlist and proceeds to request and play the segments, as per its design.

Causing the CPE 120 to wait until the edge segmentation server 118 has enough data to build the initial playlist will create a long channel change time. Typically segments range in size from 2-10 seconds in length, leading to a similar delay for the CPE 120 to begin receiving segments from the edge segmentation server 118. This delay for channel changes is unacceptable to many customers.

Accordingly, when the CPE 120 issues the request for the playlist from the edge segmentation server 118, and the stream is not currently active on the edge segmentation server 118, then the edge segmentation server 118 requests a playlist for each of the variants of the stream from the origin segmentation server 110 or the caching server 116. When multiple origin segmentation servers are present at the headend 102, the request for the playlist may be directed to the master origin segmentation server 110. The playlists returned from the caching server 116 or origin segmentation server 110 contain a list of multiple segments. The edge segmentation server 118 identifies a predetermined number of final segments from each of the returned playlists and requests the predetermined number of final segments from the origin segmentation server 110 or the caching server 116. The predetermined number of final segments from the returned playlist may be the final two segments from each of the returned playlists, for example. Other numbers of segments may be used for the predetermined number of final segments, such as the final 3, 4, 5 or other number of final segments in the returned playlist. Because of the small size and availability of bandwidth on the link between the headend 102 and the remote video distribution center 104, these segments arrive very quickly to the edge segmentation server 118. The edge segmentation server 118 stores the retrieved segments in the same location where locally created segments are stored.

The edge segmentation server 118 constructs a playlist listing the predetermined number of final segments retrieved (and the location of any needed decryption keys) and returns this to the CPE 120. The CPE 120 receives the playlist and proceeds to request and play the segments, as per its design.

By retrieving segments from the origin segmentation server 110 or caching server 116, the expected channel-change latency decreases from 2-10 seconds to a much more acceptable time less than 1 second.

As the CPE 120 continues to play the content, it periodically requests updated playlist files from the edge segmentation server 118. In order to serve updated playlists, after the edge segmentation server 118 creates the playlist with the predetermined number of final segments, the edge segmentation server 118 joins the multicast group(s) for the requested stream, and begins to create segments, locally, for the content. The segments created locally by the segmentation server 118 may be created as described in the above referenced patent application so that each of the origin segmentation server 110 and the edge segmentation server 118 create identical segments for the same stream.

The new segments created by the edge segmentation server 118 will follow chronologically after the predetermined number of final segments retrieved from the origin segmentation server 110. The edge segmentation server 118 will append the newly created segments to the playlist defining the locations where the segments can be retrieved and the CPE 120 will request those newly created segments as part of its playback process.

In most cases the first segment created by an edge segmentation server 118, after joining the multicast group(s) for the requested stream, will not follow chronologically after the predetermined number of final segments retrieved from the origin segmentation server 110 or caching server 116. If the segment number of the first segment created by the edge segmentation server 118 in response to the request for the requested stream from the CPE 120 is greater than one more than the highest segment number of the retrieved predetermined number of final segments, then the edge segmentation server 118 will request the missing segment(s) from the origin segmentation server 110 or caching server 116. For example, if segments "78" and "79" are the predetermined number of final segments retrieved from the origin segmentation server 110 or caching server 116, and the edge segmentation server 118 begins segmenting, and determines that the first segment number it can create is "82", then the edge segmentation server 118 would request segments "80" and "81" from the origin segmentation server 110 or caching server 116. If these segments are required, they are stored in the same location as locally created segments, and indexed in the playlist being returned to the CPE 120.

Going forward, the edge segmentation server 118 continues to create segments for the requested stream and update the playlist as needed. No further communication with the origin segmentation server 110 or caching server 116 is required. As described above, the edge segmentation server 118 continues to create segments until the stream timer indicates that no playlist requests have been received for the configured timeout.

Performing the segmentation on the edge segmentation server 118 reactive to requests from CPEs in the remote video distribution center 104 allows for significant savings of bandwidth on the communication pathway between the remote video distribution center 104 and the headend 102. Likewise, significant savings of bandwidth are realized by discontinuing the transmission of streams between the headend 102 and the remote video distribution center 104 that are no longer being requested by CPEs in the remote video distribution center 104. Otherwise, CPEs would either have to issue requests for every video segment and playlist to the origin segmentation server 110 directly, or the edge segmentation server 118 would need to request multicast delivery for the entire lineup of video streams available at the headend 102. In the former case, each CPE request for segments and playlists from the origin segmentation server 110 would be a unicast request. With many CPE devices connected to a remote video distribution center 104, the bandwidth requirements for the communication pathway could add up quickly. In the latter case, the edge segmentation server 118 is requesting the complete set of streams from the headend 102, even though statistically it is extremely unlikely that every stream would be required simultaneously by the set of CPEs connected to that edge segmentation server 118. The transmission of the unused streams over the link between the headend 102 and the remote video distribution center 104 creates needless bandwidth requirements on the communication pathway.

Recordings are made by not deleting the segments owned by customers that had scheduled recordings including the segments (of a stream at a specified time). Specifically, the origin segmentation server 110 continually makes segments for all streams, all the time. A remote storage DVR recording is made by preserving the segments of a stream that comprise the recording, so long as the recording is needed to remain available to a user (e.g., the recording has not timed out or at least one user has not deleted the recording from their DVR). The middleware software keeps track of when recordings are to be made, by recording a stream name or identification, a start time for the recording, and a duration of the recording. The middleware also keeps track of which users have made recordings.

The origin segmentation server 110 receives a message from the middleware indicating that the segments associated with the stream name or identification, starting at the start time (e.g., measured in GMT, TAI, UTC, etc.), and lasting for the duration, are locked, and must not be deleted. The origin segmentation server 110 converts the start time and duration into the segment numbers, and stores those segment numbers in a local database (not shown), indicating that they should not be deleted, during a segment purge routine. If the stream is part of a stream group, then all the segments in various codec formats, bitrates, and resolutions will be preserved and not deleted.

If multiple users request copies of the same segments, the origin segmentation server 110 receives a message from the middleware for each recording that must be preserved on the origin segmentation server 110. The original segmentation server 110 notes in its local database a reference count of the number of users referencing each segment. In some instances, the origin segmentation server may make a copy of each segment in a recording for each user referencing the segment at a particular time. Accordingly, requirements of some broadcasters which require that a copy of the recorded segments be kept for each user who owns the recording may be satisfied.

When a user no longer requires a recording, or if the recording is deemed too old or otherwise times out (e.g., a user is only allowed to maintain a recording for a predetermined period of time), the origin segmentation server 110 receives a message from the middleware that there is one fewer users requiring the segments comprising the undesired recording. The message from the middleware includes a stream name or other identification of the undesired recording, a start time (e.g., measured in GMT, TAI, UTC, etc.) of the undesired recording, and a duration of the undesired recording. The origin segmentation server 110 converts the start time and duration into a set of segment numbers and decrements the reference counts by one for segments in the set of segment numbers in the local database. If the reference count for a segment in the local database gets to zero then the segment is deleted in the next segment purge routine, since no further users are referencing the segment.

In some instances, the storage of segments for all streams by the origin segmentation server 110 permits users to rewind the stream, and playback from an earlier time (e.g. to watch a show from the beginning if you start it in the middle).

When a user requests playback of a recorded stream (e.g. playback of a stream recording, rewinding a live show to the beginning, or any other case), the CPE 120 makes a request to the middleware for a playlist for the recorded stream. The middleware then communicates with a packager server (not shown), which in some instances may co-exist on the origin segmentation server 110. The middleware includes a name or identifier of the desired recorded stream, a start time, and a duration of playback of the desired recorded stream to the packager server. The packager server converts the start time and duration of the desired recorded stream into segment numbers. In some instances, the packager will encrypt the segments using an encryption key retrieved from the key server 114. In some instances, the packager will create a playlist, or manifest file listing the segments of the desired recorded stream, as well as the variants available in the stream group for the desired recording. The packager server returns a URL where the playlist can be retrieved to the middleware. The middleware returns the URL for the desired recording to the CPE 120. The CPE 120 then uses the playlist to present the recorded stream to the user as per its design.

Figure 2:
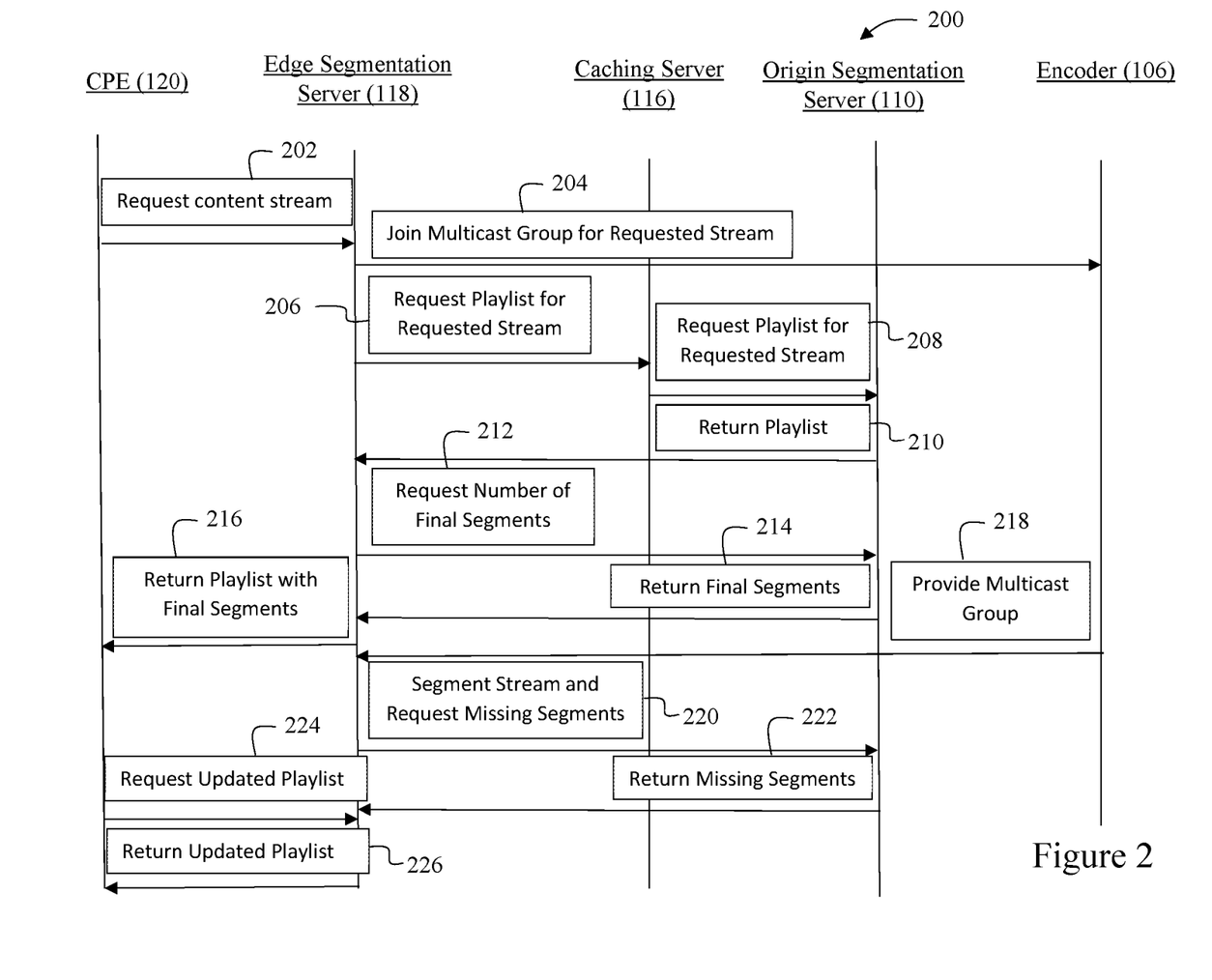
FIG. 2 shows an exemplary sequence diagram for facilitating low bandwidth communications between a headend and a remote video distribution center in the video distribution system according to various embodiments of the disclosure.

FIG. 2 shows an exemplary sequence diagram 200 for facilitating low bandwidth communications between the headend 102 and the remote video distribution center 104 in the video distribution system 100 according to various embodiments of the disclosure.

As discussed above, the edge segmentation server 118 receives a request for a playlist of a content stream from the CPE 120 at 202, for example in response to a selection to change a channel on the CPE 120. At 204, the edge segmentation server 118 checks to determine if it is currently receiving a multicast group with the requested stream from the headend 102 and creating segments for the requested stream. At 204, the edge segmentation server 118 determines that it is not already receiving the multicast group and sends a request to the headend 102, for example to encoder 106, to join the multicast group for the requested content stream.

At 206, the edge segmentation server 118 also sends a request to the caching server 116 for a playlist for the requested stream. The caching server 116 checks a local cache store to determine if the requested playlist is present in the cache. At 208, the caching server 116 determines that the cache store on the caching server 116 does not contain the requested playlist and the caching server 116 passes the request for the playlist to the origin segmentation server 110. As noted above, the origin segmentation server 110 creates segments and playlists for every video stream originating at the headend 102, such as those being output from the encoder 106. Accordingly, at 210, the origin segmentation server 110 returns the requested playlist to the edge segmentation server 118. In other words, the edge segmentation server 118 receives a reply with the requested playlist. While not shown in FIG. 2, the origin segmentation server 110 may pass the requested playlist through the caching server 116 so that a copy of the requested playlist is stored in the cache store on the caching server 116.

At 212, the edge segmentation server 118 sends a request to the origin segmentation server 110 for a predetermined final number of segments from the returned playlist, for example the final two segments. In instances where the caching server 116 already had the requested playlist in the cache store, the request may be directed to the caching server 116 instead. In some implementations, regardless of whether the caching server 116 has the requested playlist and associated segments, all requests and replies between the edge segmentation server 118 and the origin segmentation server 110 may flow through the caching server 116. At 214, the origin segmentation server 110 returns the predetermined final number of segments from the returned playlist. In other words, the edge segmentation server 118 receives a reply with the predetermined final number of segments from the returned playlist. At 216, the edge segmentation server 118 constructs a playlist with the predetermined final number of segments and returns the playlist with the playlist with the predetermined final number of segments to the CPE 120. As noted above, the amount of time between when the CPE 120 requests the content stream at 202 and the playlist with the predetermined final number of segments is returned to the CPE 120 is less than 1 second.

At 218, the headend 102, for example, encoder 106, provides the requested multicast group to the edge segmentation server 118. In other words, the edge segmentation server 118 receives the requested multicast group from the headend 102, for example, from encoder 106. While shown as occurring at a particular location in the sequence diagram, the edge segmentation server 118 may receive the requested multicast group at any time after the edge segmentation server 118 sends the request to join the multicast group for the requested content stream, at 204.

At 220, the edge segmentation server 118 begins to segment the requested stream from the received multicast group. As discussed above, the edge segmentation server 118 and the origin segmentation server 110 generate identical segments and playlists from the same stream. Upon generating a first segment from the requested stream, the edge segmentation server 118 compares a first segment number of the first segment to a second segment number of the last segment of the predetermined final number of segments. Based on the comparison, the edge segmentation server 118 identifies a sequence of one or more missing segment numbers that span from the first segment number to the second segment number. The edge segmentation server 118 sends a request to the origin segmentation server 110 for the missing segments. At 222, the origin segmentation server 110 returns the missing segments in response to the request from the origin segmentation server 110 for the missing segments. In other words, the edge segmentation server 118 receives the missing segments in response to the request for the missing segments. As noted above, the request and reply between the edge segmentation server 118 and the origin segmentation server 110 may pass through the caching server 116.

At 224, the CPE 120 periodically requests an updated playlist for the requested stream. The CPE 120 may request an updated playlist upon reaching the last segment in the current playlist or at any other time. At 226, the edge segmentation server 118 returns an updated playlist with the missing segments as well as any segments already generated by the edge segmentation server 118 at the time of the request. Going forward, the edge segmentation server 118 will generate segments and update the playlist for the requested stream and reply directly to the CPE 120 on future playlist update requests without need for further communications with any of the caching server 116 or the origin segmentation server 110.

Figure 3:
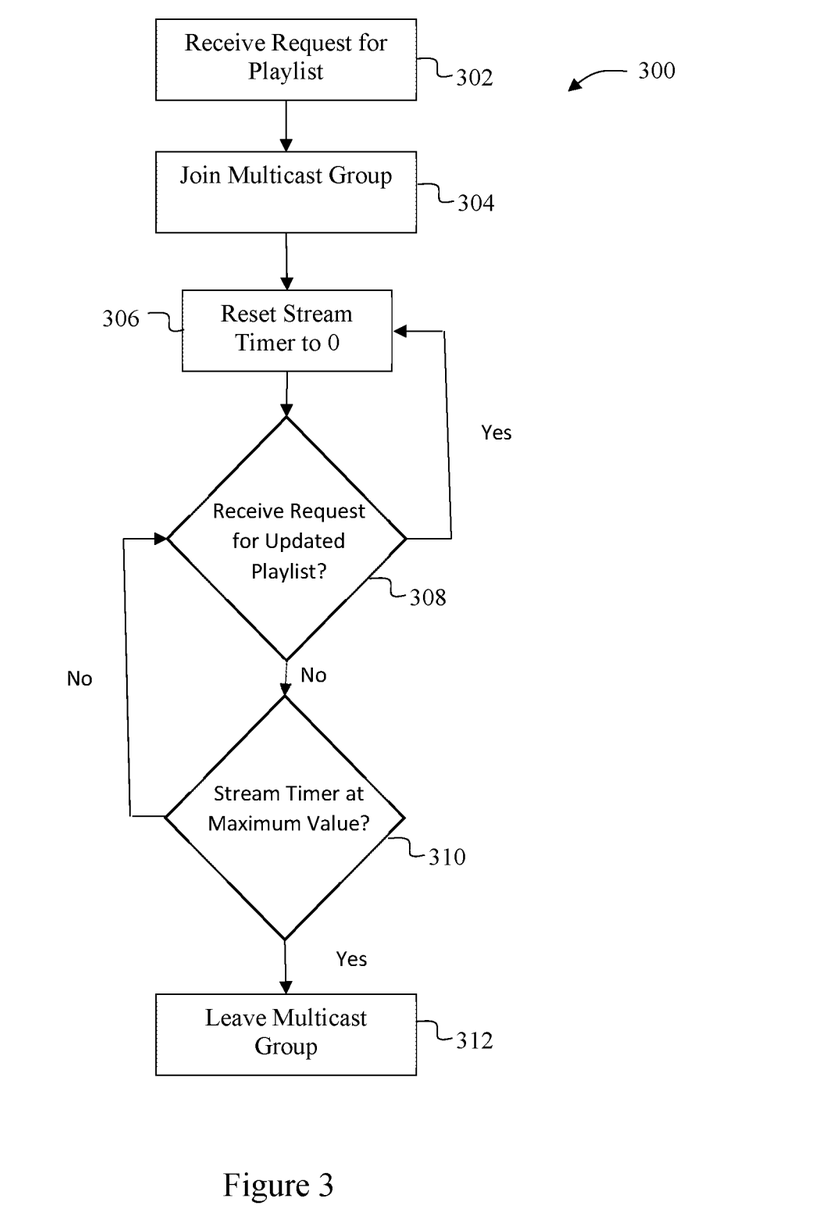
FIG. 3 shows an exemplary process for an edge segmentation server to join and leave a multicast group from the headend.

FIG. 3 shows an exemplary process 300 for the edge segmentation server 118 to join and leave a multicast group from the headend 102. At 302, the edge segmentation server 118 receives a request for a playlist of a content stream. For example, the edge segmentation server 118 may receive the request from the CPE 120 in response to the CPE 120 receiving a request to change a channel. At 304, the edge segmentation server 118 determines that it is not already receiving a multicast group with the content stream and sends a request to the headend 102, for example to encoder 106, to join the multicast group for the requested content stream. At 306, the edge segmentation server 118 resets a stream timer to zero. The stream timer may be maintained by the edge segmentation server 118 or an external device in communication with the edge segmentation server 118. The stream timer may increment over time unless reset by the edge segmentation server 118.

At 308, the edge segmentation server 118 determines whether it has received a request for an updated playlist for the content stream, for example, from the CPE 120 or other CPE in the remote video distribution center 104. If yes, the process proceeds back to 306 to again reset the stream timer to zero. If no, at 310, the edge segmentation server 118 determines whether the stream timer is at a maximum value. For example, the edge segmentation server 118 may be configured with a maximum stream timer value of a predetermined period of time (e.g., 2 minutes). If no, the process proceeds back to 308 where the edge segmentation server 118 again determines whether a request for an updated playlist for the content stream has been received. If yes, then the edge segmentation server 118 determines that no CPE in the remote video distribution center 104 are requesting the stream and the edge segmentation server 118 leaves the multicast group for the content stream at 312. In this way, the content stream stops transferring across the link between the headend 102 and the remote video distribution center 104. In other words, the remote video distribution center 104 stops receiving the content stream in response to a determination by the edge segmentation server 118 that no CPE in the remote video distribution system 104 are requesting the content stream.

It should be appreciated that the logical operations described herein with respect to the various figures may be implemented (1) as a sequence of computer implemented acts or program modules (i.e., software) running on a computing device (e.g., the computing device described in FIG. 4), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

Figure 4:
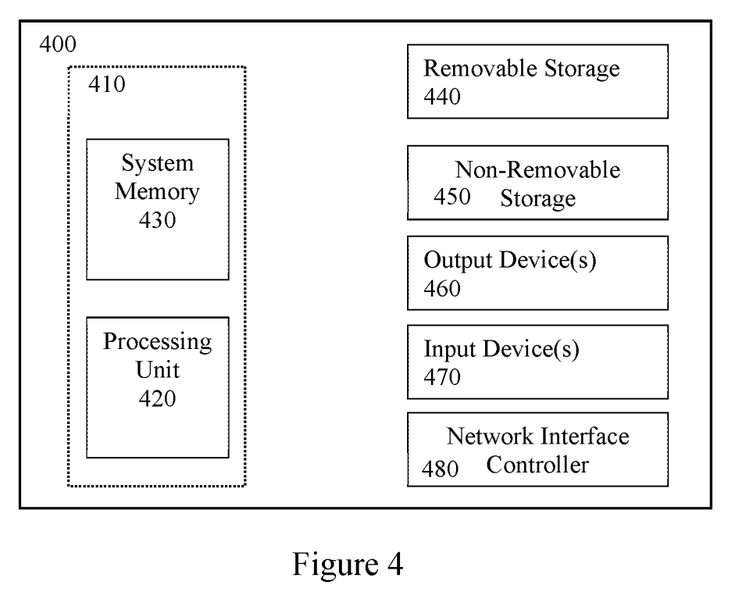
FIG. 4 illustrates an exemplary computer system suitable for implementing the several embodiments of the disclosure.

Referring to FIG. 4, an example computing device 400 upon which embodiments of the invention may be implemented is illustrated. For example, each of the content source, key server, segmentations servers, caching servers, and client devices described herein may each be implemented as a computing device, such as computing device 400. It should be understood that the example computing device 400 is only one example of a suitable computing environment upon which embodiments of the invention may be implemented. Optionally, the computing device 400 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 400 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 400 to provide the functionality of a number of servers that is not directly bound to the number of computers in the computing device 400. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 400 typically includes at least one processing unit 406 and system memory 404. Depending on the exact configuration and type of computing device, system memory 404 may be volatile (such as random access memory (RAM)), non-volatile (such as read-only memory (ROM), flash memory, etc.), or some combination of the two. This most basic configuration is illustrated in FIG. 4 by dashed line 402. The processing unit 406 may be a standard programmable processor that performs arithmetic and logic operations necessary for operation of the computing device 400. While only one processing unit 406 is shown, multiple processors may be present. Thus, while instructions may be discussed as executed by a processor, the instructions may be executed simultaneously, serially, or otherwise executed by one or multiple processors. The computing device 400 may also include a bus or other communication mechanism for communicating information among various components of the computing device 400.

Computing device 400 may have additional features/functionality. For example, computing device 400 may include additional storage such as removable storage 408 and non-removable storage 410 including, but not limited to, magnetic or optical disks or tapes. Computing device 400 may also contain network connection(s) 416 that allow the device to communicate with other devices such as over the communication pathways described herein. The network connection(s) 416 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 400 may also have input device(s) 414 such as keyboards, keypads, switches, dials, mice, track balls, touch screens, voice recognizers, card readers, paper tape readers, or other well-known input devices. Output device(s) 412 such as printers, video monitors, liquid crystal displays (LCDs), touch screen displays, displays, speakers, etc. may also be included. The additional devices may be connected to the bus in order to facilitate communication of data among the components of the computing device 400. All these devices are well known in the art and need not be discussed at length here.

The processing unit 406 may be configured to execute program code encoded in tangible, computer-readable media. Tangible, computer-readable media refers to any media that is capable of providing data that causes the computing device 400 (i.e., a machine) to operate in a particular fashion. Various computer-readable media may be utilized to provide instructions to the processing unit 406 for execution. Example tangible, computer-readable media may include, but is not limited to, volatile media, non-volatile media, removable media, and non-removable media implemented in any method or technology for storage of information such as computer readable instructions, data structures, program modules or other data. System memory 404, removable storage 408, and non-removable storage 410 are all examples of tangible, computer storage media. Example tangible or non-transitory, computer-readable storage media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 406 may execute program code stored in the system memory 404. For example, the bus may carry data to the system memory 404, from which the processing unit 406 receives and executes instructions. The data received by the system memory 404 may optionally be stored on the removable storage 408 or the non-removable storage 410 before or after execution by the processing unit 406.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media or non-transitory computer readable medium, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a non-transitory computer-readable storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A content distribution system, comprising:
an origin segmentation server at a headend comprising a processor and computer instructions stored in a non-transitory computer readable storage medium, wherein the processor is configured to execute the instructions to cause the origin segmentation server to:
create segments and a playlist for a content stream that is output from an encoder at the headend according to a segmented content streaming standard; and
an edge segmentation server at a remote content distribution center comprising a second processor and second computer instructions stored in a non-transitory computer readable storage medium, wherein the second processor is configured to execute the second instructions to cause the edge segmentation server to:
receive a request for a playlist of the content stream from a customer premise equipment,
send a second request to the origin segmentation server for the playlist,
identify a predetermined number of final segments from the playlist returned from the origin segmentation server,
send a third request to the origin segmentation server for the predetermined number of final segments from the playlist,
construct a second playlist listing the predetermined number of final segments,
return the second playlist listing the predetermined number of final segments to the customer premise equipment in response to the request;
join a multicast group for the content stream output from the encoder in response to the request for the playlist of the content stream from the customer premise equipment;
create a second plurality of segments for the content stream from the multicast group according to the segmented content streaming standard; and
append the second playlist with the second plurality of segments after the predetermined number of final segments.

2. The content distribution system of claim 1, wherein the content stream is a segmented video stream.

3. The content distribution system of claim 1, further comprising a caching server between the origin segmentation server and the edge segmentation server, the caching server comprising a third processor and third computer instructions stored in a non-transitory computer readable storage medium, wherein the third processor is configured to execute the third instructions to cause the caching server to:
receive the second request from the edge segmentation server,
determine whether the playlist is stored in a cache store of the caching server, and
pass the second request to the origin segmentation server in response to a determination that the playlist is not stored in the cache store.

4. The content distribution system of claim 1, wherein the processor is configured to execute the instructions to cause the origin segmentation server to create segments and playlists for every content stream originating at the headend according to a segmented content streaming standard.

5. The content distribution system of claim 1, wherein the second processor is configured to execute the second instructions to cause the edge segmentation server to:
determine that the edge segmentation server is not already receiving the multicast group with the content stream, and
responsive to the determination, send a request to the headend to join the multicast group for the content stream.

6. The content distribution system of claim 1, wherein the second processor is configured to execute the second instructions to cause the edge segmentation server to:

determine one or more missing segments between a last segment of the predetermined number of final segments and a first segment of the second plurality of segments, send a fourth request to the origin segmentation server for the one or more missing segments, and update the second playlist with the one or more missing segments.

7. The content distribution system of claim 1, wherein the second processor is configured to execute the second instructions to cause the edge segmentation server to:

reset a stream timer associated with the content stream to zero in response to the request for the playlist from the customer premise equipment.

8. The content distribution system of claim 7, wherein the second processor is configured to execute the second instructions to cause the edge segmentation server to:

determine whether a subsequent request for an updated playlist for the content stream is received from customer premise equipment in the remote content distribution center within a maximum stream timer threshold value, and leave the multicast group for the content stream in response to a determination that a subsequent request for an updated playlist for the content stream has not been received within the maximum stream timer threshold value.

9. The content distribution system of claim 1, wherein the second processor is configured to execute the second instructions to cause the edge segmentation server to:

maintain the second playlist and associated segments on the edge segmentation server as a recording of the content stream for the customer premise equipment.

10. A method of distributing segmented content, comprising:

receiving, by an edge segmentation server, a request for a playlist of a content stream from a customer premise equipment;

sending, by the edge segmentation server, a second request for the playlist to a server remote from the edge segmentation server;

identifying a predetermined number of final segments from the playlist returned from the server;

sending a third request to the server for the predetermined number of final segments from the playlist;

constructing a second playlist listing the predetermined number of final segments;

returning the second playlist to the customer premise equipment in response to the request;

joining, by the edge segmentation server, a multicast group for the content stream in response to the request for the playlist of the content stream from the customer premise equipment;

creating, by the edge segmentation server, a second plurality of segments for the content stream from the multicast group; and appending, by the edge segmentation server, the second playlist with the second plurality of segments after the predetermined number of final segments.

11. The method of claim 10, wherein the content stream is a segmented video stream.

12. The method of claim 10, where the server is an origin segmentation server at a headend, the method further comprising:

receiving, by a caching server, the second request from the edge segmentation server;

determining, by the caching server, whether the playlist is stored in a cache store of the caching server; and passing, by the caching server, the second request to the origin segmentation server in response to a determination that the playlist is not stored in the cache store.

13. The method of claim 10, wherein the server is an origin segmentation server, the method further comprising:

creating, at the origin segmentation server, the predetermined number of final segments and the playlist for the content stream originating at a headend according to a segmented content streaming standard.

14. The method of claim 10, further comprising:

determining, by the edge segmentation server, that the edge segmentation server is not already receiving the multicast group with the content stream; and responsive to the determination, sending a request to a headend to join the multicast group for the content stream.

15. The method of claim 13, wherein creating the second plurality of segments for the content stream from the multicast group further comprises:

segmenting, by the edge segmentation server, the content stream from the multicast group into the second plurality of segments according to the segmented content streaming standard.

16. The method of claim 15, further comprising:

determining, by the edge segmentation server, one or more missing segments between a last segment of the predetermined number of final segments and a first segment of the second plurality of segments;

sending, by the edge segmentation server, a fourth request to the server for the one or more missing segments; and updating, by the edge segmentation server, the second playlist with the one or more missing segments.

17. The method of claim 10, further comprising:

resetting, by the edge segmentation server, a stream timer associated with the content stream to zero in response to the request for the playlist from the customer premise equipment.

18. The method of claim 17, further comprising:

determining, by the edge segmentation server, whether a subsequent request for an updated playlist for the content stream is received within a maximum stream timer threshold value; and leaving, by the edge segmentation server, the multicast group for the content stream in response to a determination that a subsequent request for an updated playlist for the content stream has not been received within the maximum stream timer threshold value.

19. The method of claim 10, further comprising:

maintaining, by the edge segmentation server, the second playlist and associated segments on the edge segmentation server as a recording of the content stream for the customer premise equipment.

* * * * *